(No Model.)

J. H. & W. S. HOWARD.
PLOW CLEVIS.

No. 512,964.                          Patented Jan. 16, 1894.

Witnesses.
A. Ruppert.
H. A. Daniels

Inventors.
James H. Howard
William S. Howard
Per
Thomas P. Simpson
Atty

UNITED STATES PATENT OFFICE.

JAMES H. HOWARD AND WILLIAM S. HOWARD, OF SMITHBOROUGH, GEORGIA.

PLOW-CLEVIS.

SPECIFICATION forming part of Letters Patent No. 512,964, dated January 16, 1894.

Application filed November 10, 1893. Serial No. 490,611. (No model.)

*To all whom it may concern:*

Be it known that we, JAMES H. HOWARD and WILLIAM S. HOWARD, citizens of the United States, residing at Smithborough, in the county of Jasper and State of Georgia, have invented certain new and useful Improvements in Plow-Clevises; and we do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a plow-clevis, with lap-hooks working horizontally, held stationary on the beam by a screwpin so that the plow may run steady, and made reversible so that the plow may work deep or shallow.

Figure 1:
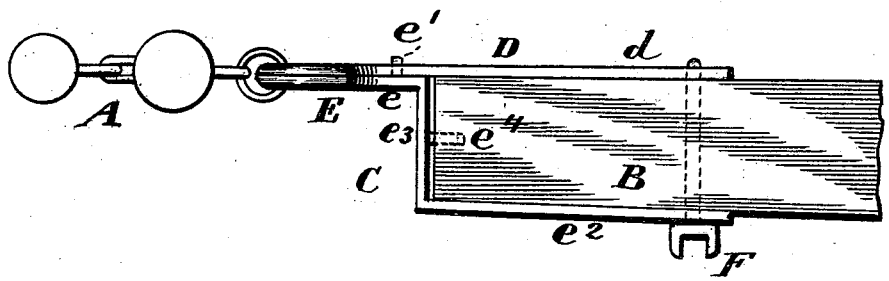
Figure 1:
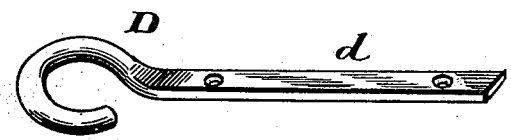
Figure 2:
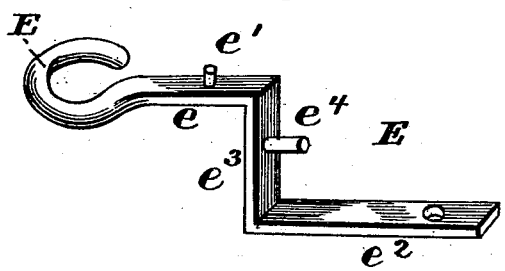
Figure 3:

Figure 1 of the drawings is a side-elevation, showing a plowbeam provided with our improved clevis; Fig. 2 a perspective view of the clevis with the laphooks set apart from each other, and. Fig. 3 a detail view of our wrenchpin.

In the drawings, A represents the double tree, B the beam, and C the draft-clevis of a plow.

The clevis C has two lap-hooks D E of which the hook D has a long straight shank $d$ turning on a pin $e'$ of the other hook, while the hook E has a right-angled shank $e$ whose long arm $e^2$ is parallel to the shank $d$, so as to clamp the upper and lower side of the beam B, while the short arm $e^3$ is at right angles to the shank $d$ and abuts against the front end of the beam. In the middle of the inside of the arm $e^3$ projects therefrom the spur $e^4$ which enters a corresponding hole in the front end of the beam and thus prevents it from being turned laterally. Near the rear ends of the shanks $d\,e$ are made opposite registering holes to receive the bolt F which passes perpendicularly through the beam and engages with its thread a corresponding female thread in the shank $d$.

The bolt F is preferably made with a wrench-head in order to be convenient for turning off or on the nuts of the plow.

What we claim as new, and desire to secure by Letters Patent, is—

A plow-clevis formed of two lap-hooks D E, the hook D having a straight pivoted shank and the hook E a right-angled shank $e$ with the spur $e^4$ in the middle of its perpendicular arm, the ends of the shanks being clamped by a screwbolt as shown; whereby the clevis is reversible and held immovable on the beam as and for the purpose set forth.

In testimony whereof we affix our signatures in presence of two witnesses.

JAMES H. HOWARD.
WILLIAM S. HOWARD.

Witnesses:
C. H. JORDAN,
W. F. JORDAN.